United States Patent
Otowa et al.

(10) Patent No.: US 10,843,477 B2
(45) Date of Patent: Nov. 24, 2020

(54) MAKEUP FLUID AND INKJET PRINTER APPARATUS

(71) Applicant: Hitachi Industrial Equipment Systems Co., Ltd., Tokyo (JP)

(72) Inventors: Takuya Otowa, Tokyo (JP); Masahiko Ogino, Tokyo (JP); Hiroshi Sasaki, Tokyo (JP); Takahiro Arima, Tokyo (JP); Keisuke Nagai, Tokyo (JP); Hiromichi Takeyama, Tokyo (JP); Shengnan Hua, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 15/767,941

(22) PCT Filed: Jun. 3, 2016

(86) PCT No.: PCT/JP2016/066526
§ 371 (c)(1),
(2) Date: Apr. 12, 2018

(87) PCT Pub. No.: WO2017/064879
PCT Pub. Date: Apr. 20, 2017

(65) Prior Publication Data
US 2018/0304639 A1 Oct. 25, 2018

(30) Foreign Application Priority Data
Oct. 14, 2015 (JP) ................................. 2015-202548

(51) Int. Cl.
*B41J 2/195* (2006.01)
*B41J 2/175* (2006.01)
(Continued)

(52) U.S. Cl.
CPC ............. *B41J 2/17566* (2013.01); *B41J 2/02* (2013.01); *B41J 2/17506* (2013.01);
(Continued)

(58) Field of Classification Search
CPC combination set(s) only.
See application file for complete search history.

(56) References Cited

U.S. PATENT DOCUMENTS 5,958,122 A 9/1999 Fukuda et al.
8,840,220 B2 9/2014 Taniguchi et al.
(Continued)

FOREIGN PATENT DOCUMENTS

CN 1141240 A 1/1997
CN 104203588 A 12/2014
(Continued)

OTHER PUBLICATIONS

International Search Report (PCT/ISA/210) issued in PCT Application No. PCT/JP2016/066526 dated Aug. 30, 2016 with English-language translation (four (4) pages).
(Continued)

*Primary Examiner* — Sharon Polk
(74) *Attorney, Agent, or Firm* — Crowell & Moring LLP

(57) ABSTRACT

A makeup fluid is added to an ink liquid of an inkjet printer to reduce the viscosity of the ink liquid, the makeup fluid including a fluorescent color material in a solvent. An inkjet printer apparatus employing a makeup fluid is provided with a makeup fluid tank to which a light-emitting element and a light-receiving element are attached, and detects the presence or absence of the makeup fluid by irradiating ultraviolet light from the light-emitting element, causing visible light to be emitted from the fluorescent color material in the makeup fluid, and detecting the visible light with the light-receiving element.

6 Claims, 8 Drawing Sheets

(51) Int. Cl.
  *B41J 2/02* (2006.01)
  *C09D 11/38* (2014.01)
  *C09D 11/36* (2014.01)
  *C09D 11/50* (2014.01)
  *C09D 11/328* (2014.01)

(52) U.S. Cl.
  CPC .......... *B41J 2/17563* (2013.01); *B41J 2/195* (2013.01); *C09D 11/328* (2013.01); *C09D 11/36* (2013.01); *C09D 11/38* (2013.01); *C09D 11/50* (2013.01); *B41J 2002/17573* (2013.01)

(56) References Cited

U.S. PATENT DOCUMENTS

| | | | |
|---|---|---|---|
| 2004/0041859 A1 | 3/2004 | Hwang | |
| 2004/0246283 A1 | 12/2004 | Merz et al. | |
| 2005/0195257 A1* | 9/2005 | Tomotake | B41J 2/2132 347/101 |
| 2008/0129804 A1 | 6/2008 | Fukushima et al. | |
| 2008/0266565 A1* | 10/2008 | McConica | B41J 2/17553 356/436 |
| 2009/0115804 A1* | 5/2009 | Cai | B41J 2/17546 347/6 |
| 2010/0141719 A1 | 6/2010 | Fukushima et al. | |
| 2010/0149232 A1* | 6/2010 | Cai | B41J 2/175 347/7 |
| 2012/0261592 A1* | 10/2012 | Iftime | C09D 11/38 250/473.1 |
| 2014/0104347 A1 | 4/2014 | Iizawa | |
| 2015/0000544 A1 | 1/2015 | Shiraki et al. | |
| 2017/0120615 A1 | 5/2017 | Katou et al. | |

FOREIGN PATENT DOCUMENTS

| | | | |
|---|---|---|---|
| EP | 0 739 956 A2 | | 10/1996 |
| JP | 63-147650 A | | 6/1988 |
| JP | 8-295013 A | | 11/1996 |
| JP | 2000-203051 A | | 7/2000 |
| JP | 2000-203057 A | | 7/2000 |
| JP | 2002264355 A | * | 9/2002 |
| JP | 2004-307600 A | | 11/2004 |
| JP | 2006-159789 A | | 6/2006 |
| WO | WO 2006/062254 A1 | | 6/2006 |
| WO | WO 2013/145949 A1 | | 10/2013 |
| WO | WO 2015/151340 A1 | | 10/2015 |

OTHER PUBLICATIONS

Japanese-language Written Opinion (PCT/ISA/237) issued in PCT Application No. PCT/JP2016/066526 dated Aug. 30, 2016 (five (5) pages).

Chinese-language Office Action issued in counterpart Chinese Application No. 201680059413.4 dated Mar. 13, 2019 with English translation (12 pages).

Extended European Search Report issued in counterpart European Application No. 16855133.1 dated Jun. 4, 2019 (14 pages).

\* cited by examiner

MAKEUP FLUID AND INKJET PRINTER APPARATUS

TECHNICAL FIELD

The present invention relates to a makeup fluid used in an inkjet printer, and an inkjet printer apparatus.

BACKGROUND ART

An inkjet printer adapted to a charge control method is equipped with a tank filled with a makeup fluid for keeping a viscosity of ink in a printer apparatus at an appropriate value at all times. Being short of the makeup fluid in the tank makes it difficult to adjust the viscosity of the ink. Thus, Patent Literature 1 (JP-A-2000-203057) discloses "a method of detecting a liquid level by incorporating a magnet into a float and detecting a position of the float with the use of a reed switch as a method of detecting a liquid level of ink".

CITATION LIST

Patent Literature

PATENT LITERATURE 1: JP-A-2000-203057

SUMMARY OF INVENTION

Technical Problem

However, in liquid-level detecting techniques according to the above Patent Literature, there is a fear that a liquid level cannot be correctly detected due to mechanical friction between a float material and a float supporting member, degradation in material property, and the like, which are caused by long-term use. An object of the present invention is to provide a makeup fluid and an inkjet printer apparatus which prevent an error in detection from being caused due to the above physical friction and degradation in material property.

Solution to Problem

To achieve the above object, a makeup fluid of the present invention includes: a fluorescent color material which emits visible light when the fluorescent color material is irradiated with light; and a solvent.

Advantageous Effects of Invention

According to the present invention, it is possible to provide a makeup fluid and an inkjet printer apparatus which can allow liquid-level detection with high accuracy.

DESCRIPTION OF EMBODIMENTS

A "makeup fluid" is a liquid which is used in an inkjet printer, particularly, an inkjet printer adapted to a charge control method, in such a manner as to be added to an ink liquid when a viscosity of the ink liquid in an apparatus increases due to volatilization of a solvent or the like component so that the viscosity is reduced to an appropriate value. Generally, the inkjet printer adapted to a charge control method is equipped with a makeup fluid tank which is filled with a makeup fluid for keeping the viscosity of the ink liquid in the apparatus at an appropriate value at all times. When the makeup fluid tank becomes empty of the makeup fluid, it becomes difficult to keep the viscosity of the ink liquid at the appropriate value. For this reason, it is important to check whether or not the makeup fluid is sufficiently supplied in the tank, and to advise an operator to additionally supply a makeup fluid when an amount of the makeup fluid in the tank become low.

The present application includes a makeup fluid including a fluorescent color material, and a makeup fluid tank in which a light-emitting element and a light-receiving element are incorporated. In the present application, according to a mechanism in which a makeup fluid is caused to emit visible light by irradiation light provided from a light-emitting element and a light-receiving element senses the visible light, presence or absence of the makeup fluid in a predetermined position within the tank is detected, so that a height of a liquid level can be detected.

Below, embodiments of the present application will be described. The embodiments described below are mere examples resulted from embodying of the present application, and do not limit the technical scope of the present application.

1. Component Materials of a Makeup Fluid

A makeup fluid includes at least a fluorescent color material and a solvent. These are dissolved, stirred, and mixed, and thereafter, are filtered through a filter having a pore size of 0.25 to 10 μm, so that a makeup fluid for an inkjet printer is obtained.

(1) Fluorescent Color Material

Figure 12:
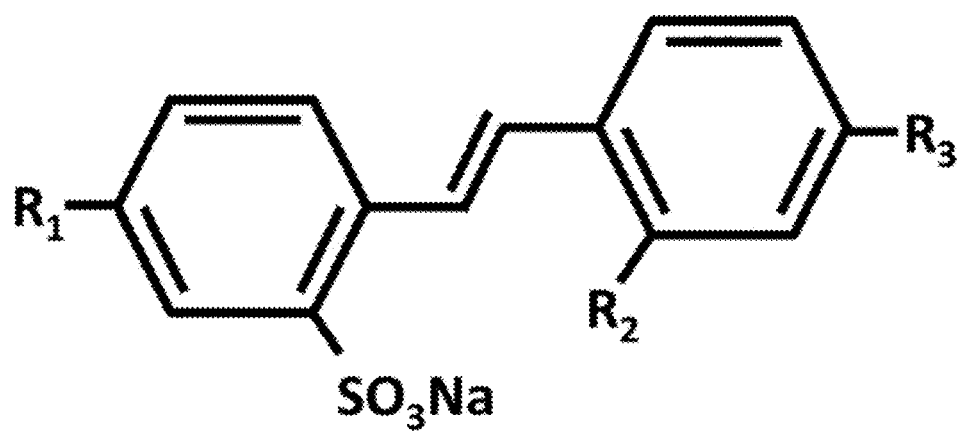
FIG. 12 shows a structural formula of a stilbene-based compound including a sulfo group.

A fluorescent color material used in the present application includes a stilbene-based compound, a biphenyl-based compound, a coumarin-based compound, an imidazole-based compound, a benzoxazolyl-based compound, a naphthalimide-based compound, a pyrazolone-based compound, a carbostyril-based compound, and a triazole-based compound, for example. Among those, as the fluorescent color material used in the invention, a stilbene-based compound is preferable in view of solubility in an organic solvent, and a stilbene-based compound including a sulfo group represented in FIG. 12 is particularly preferable. Hereinbelow, though examples of a compound for the fluorescent color material preferably used in the present application will be described, the present application is not limited to those examples.

While an increase in an amount of a fluorescent color material being added results in an increase in an amount of visible light being emitted by a makeup fluid, there is a fear that dissolution may become unstable to cause precipitation. While reduction in the amount of the fluorescent color material being added prevents precipitation of the fluorescent color material, there is a fear that emission of visible light may be insufficient. As for an example represented in FIG. 12, it has been found that addition of 1.0 wt % or more to ethanol, for example, causes precipitation. Also, when $1.0 \times 10^{-4}$ wt % or more is added, emission of light can be observed. From the above, in a case where ethanol is used as a solvent, an amount of a fluorescent color material is preferably $1.0 \times 10^{-4}$ wt % or more and less than 1.0 wt %, and is more preferably $1.0 \times 10^{-3}$ wt % or more and less than $1.0 \times 10^{-1}$ wt % in view of compatibility between stable dissolution and emission of visible light.

(2) Solvent

As a main ingredient of a solvent, an alcohol-based or ketone-based solvent is used. An alcohol-based solvent includes methanol, ethanol, propanol, butanol, and the like. A ketone-based solvent includes acetone, methyl ethyl ketone (MEK), and methyl isobutyl ketone (MIBK), for example. Those substances are individually used, or are mixed for use. Besides, an ether-based solvent or a glycol-based solvent may be added.

(3) Additive

In order to improve solubility of a fluorescent color material in a solvent, or in order to adjust various properties of a makeup fluid, such as a viscosity, conductivity, or surface tension, an additive may be added.

2. Inkjet Printer (1) Printing Method

The above makeup fluid can be used in an inkjet printer adapted to a known printing method. While the printing method includes a charge control method and a drop-on-demand method, for example, the present application is particularly suitable to a charge control method which uses a makeup fluid tank.

(2) Makeup Fluid Tank

Figure 1:
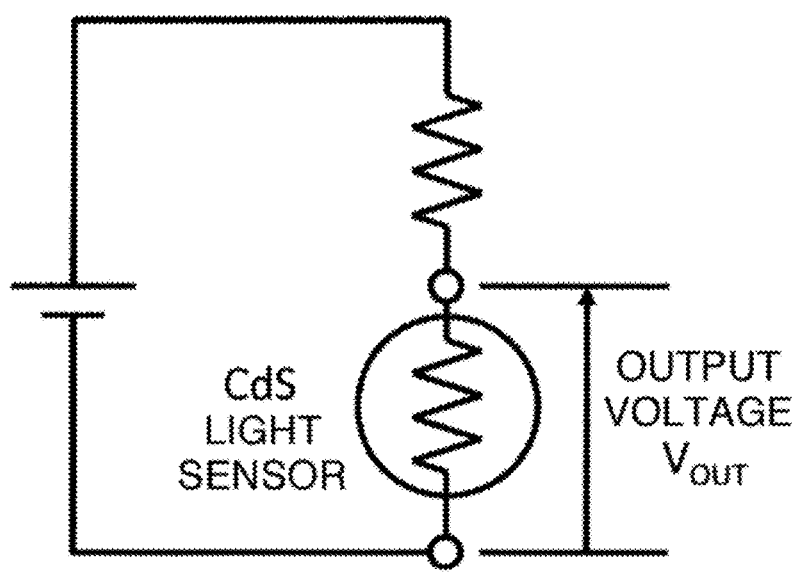
FIG. 1 is a circuit diagram of a light sensor which can be used for a light-receiving element.

By incorporating a light-emitting element and a light-receiving element into a makeup fluid tank, it is possible to detect presence or absence of a makeup fluid in a predetermined position within a tank, so that a height of a liquid level can be estimated. The light-emitting element and the light-receiving element can be incorporated in an inner wall or an outer wall of a tank. A light source of the light-emitting element is preferably an LED in view of energy savings and a longer life. As irradiation light emitted by the light source of the light-emitting element, while ultraviolet light with a wavelength having a peak value of 200 nm to 400 nm is preferable so that emission of visible light in the makeup fluid can be observed, light with a wavelength having a peak value of 315 nm to 400 nm, which is referred to as a near-ultraviolet light and slightly affects a human body, is more preferable, and light with a wavelength having a peak value of 360 to 390 nm which is safer and generally referred to as black light is the most preferable. A wavelength of emitted visible light varies depending on a kind of a fluorescent color material used for the makeup fluid, and thus, a wavelength range to be detected by a light sensor used for the light-receiving element is determined in accordance with the wavelength of the visible light emitted from the fluorescent color material. For example, in a case where a substance represented in FIG. 12 is used as the fluorescent color material, a fluorescence spectrum with a range of 400 nm to 550 nm in which 450 nm is a peak value is emitted, so that a CdS light sensor, for example, can be used as a light sensor of the light-receiving element. With the use of a property of the CdS light sensor, a resistance value of which varies depending on presence or absence of visible light, a light-receiving element may include a known sensor circuit such as a circuit shown in FIG. 1 which can detect presence or absence of the visible light by monitoring an output voltage value $V_{OUT}$, for example. Besides, a cadmium-free light sensor may be used as a light sensor. While at least one pair of the light-emitting element and the light-receiving element may be used, a plurality of pairs can be used in order to detect a height of a liquid level with higher accuracy. Also, the makeup fluid tank according to the present application may include also a liquid-level detection system using a known float for the makeup fluid, as needed. As described above, for the other purpose than a purpose of estimating the height of the liquid level of the makeup fluid according to the present application, the makeup fluid tank may be used for avoiding an error regarding a makeup fluid through presence or absence of emission of visible light in the makeup fluid being supplied, with the use of the same mechanism as described above.

Example 1

A fluorescent color material A represented by CHEM. 1 in an amount of 0.1 g was added to ethanol in an amount of 100 g and dissolved by stirring, and a resultant liquid was filtered through a filter made of polypropylene having a pore size of 0.5 µm. In this manner, a makeup fluid according to the present example was prepared.

When the prepared makeup fluid was irradiated with light having a peak value of 200 nm, emission of visible light having a peak value of 450 nm was observed in the makeup fluid.

When the prepared makeup fluid was irradiated with light having a peak value of 400 nm, emission of visible light having a peak value of 450 nm was observed in the makeup fluid.

Comparative Example 1

An ethanol liquid in an amount of 100 g was filtered through a filter made of polypropylene having a pore size of 0.5 µm. In this manner, a makeup fluid according to the present comparative example was prepared.

When the prepared makeup fluid was irradiated with light having a peak value of 200 nm, light having a peak value in a range of visible light was not observed in the makeup fluid.

When the prepared makeup fluid was irradiated with light having a peak value of 400 nm, light having a peak value in a range of visible light was not observed in the makeup fluid.

Example 2

Figure 2:
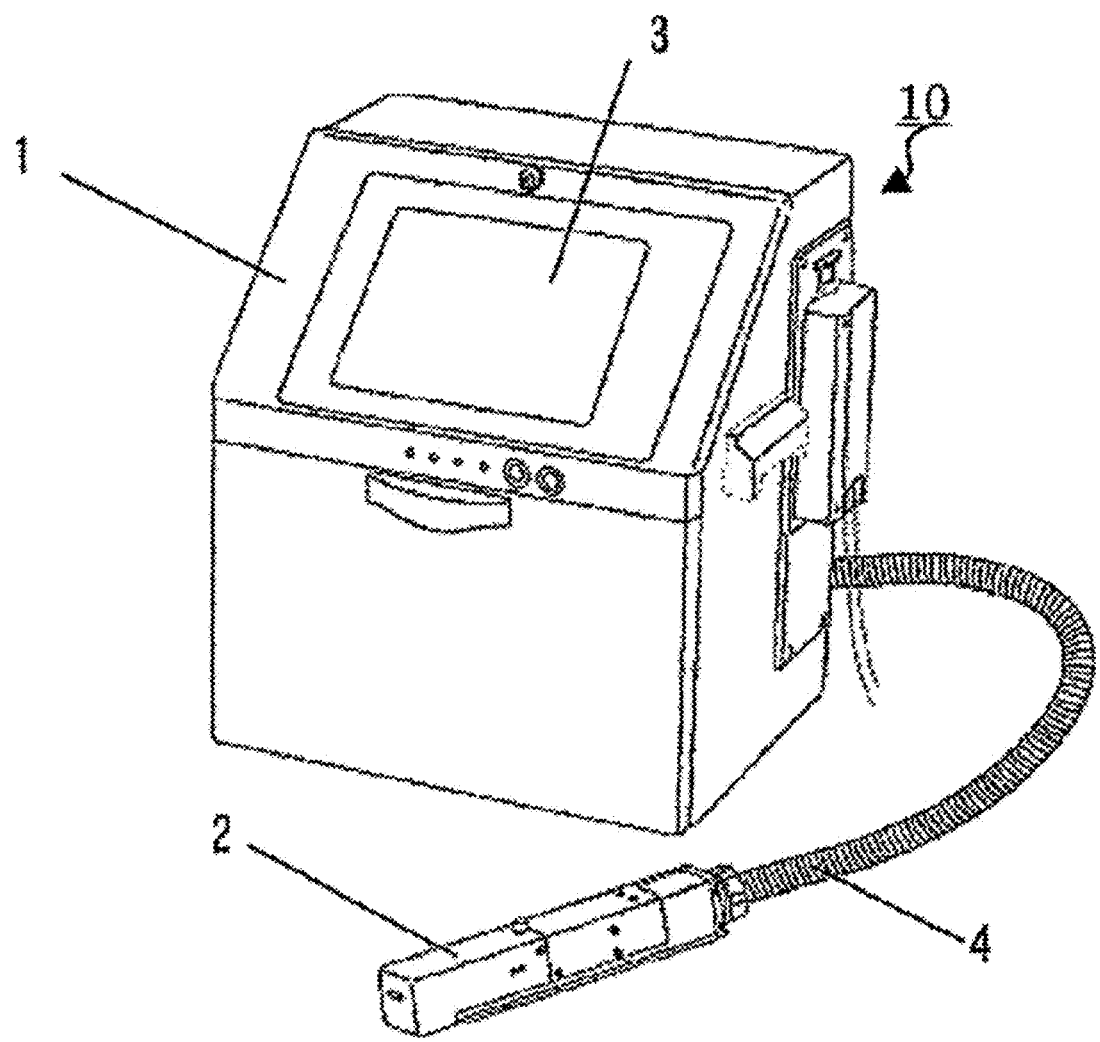
FIG. 2 is a schematic diagram of an inkjet printer apparatus.
Figure 3:
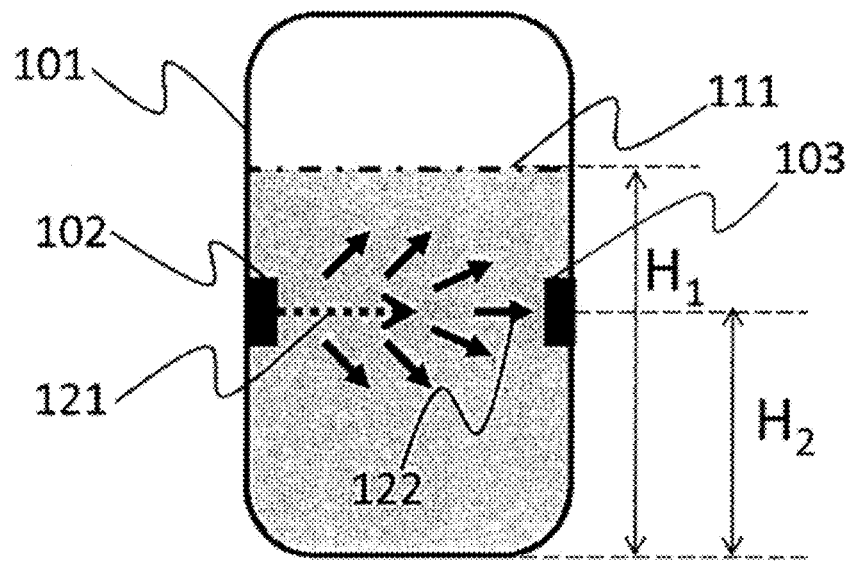
FIG. 3 is a schematic diagram of an interior of a makeup fluid tank in Example 2.
Figure 4:
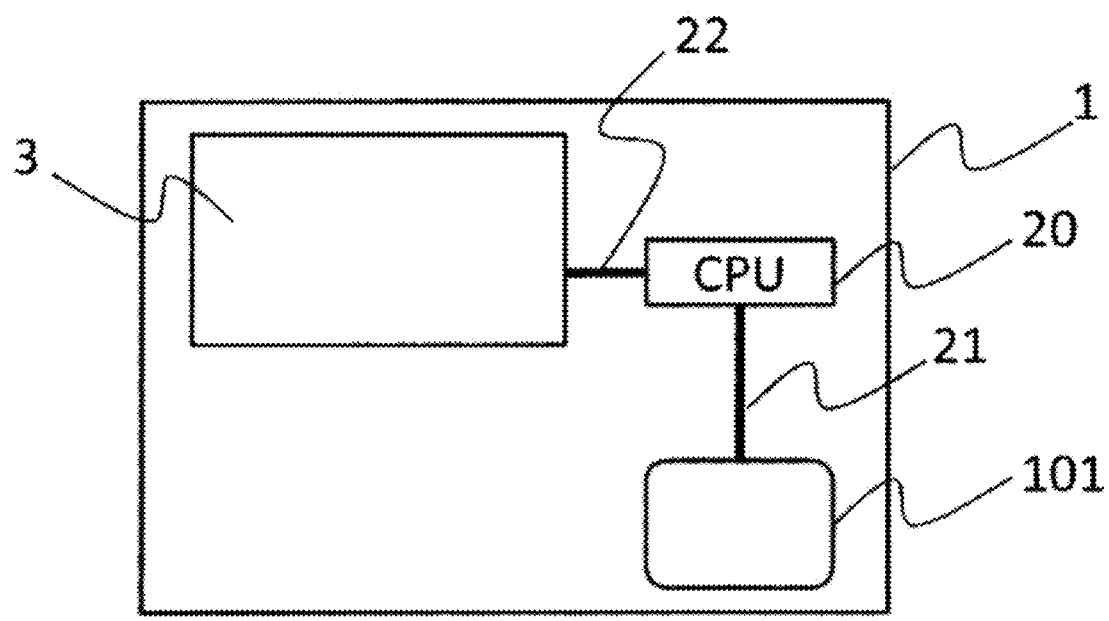
FIG. 4 is a schematic diagram showing signal transmission in the inkjet printer apparatus.
Figure 5:
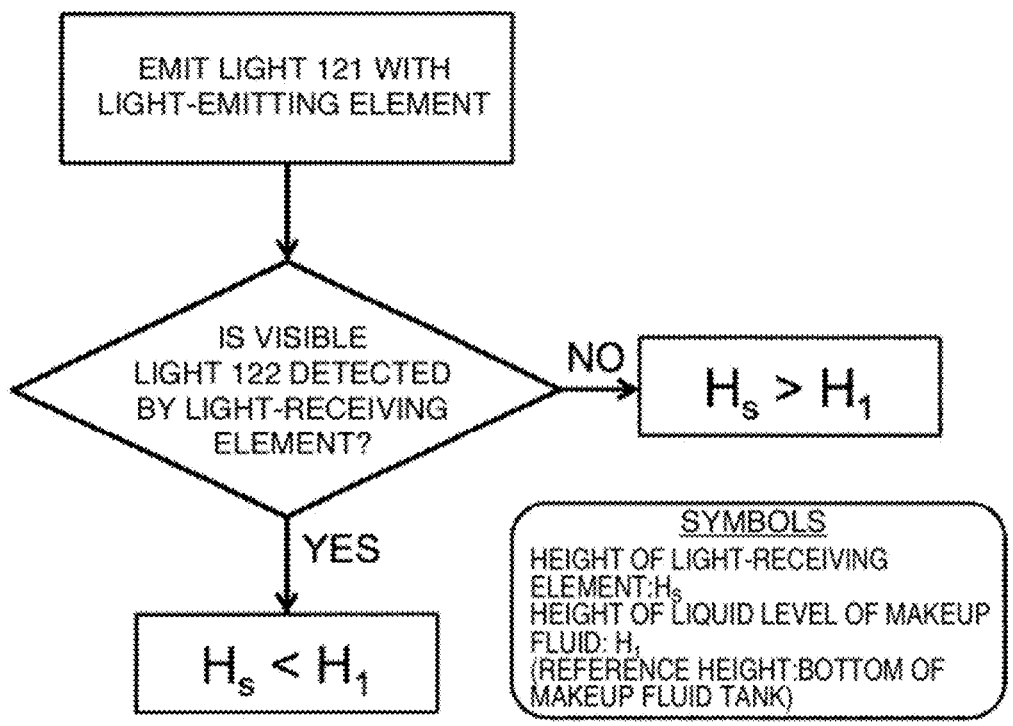
FIG. 5 is a chart showing an algorithm for judging whether a liquid level of a makeup fluid and a height of a light-receiving sensor are high or low.

FIG. 2 is a perspective view showing an inkjet printer 10, FIG. 3 is a schematic diagram of an interior of a makeup fluid tank according to Example 2, FIG. 4 is a schematic diagram showing signal transmission in an inkjet printer apparatus, and FIG. 5 is a chart showing an algorithm for judging whether a height of a liquid level of the makeup fluid and a height of a light-receiving sensor are high or low.

The inkjet printer 10 in FIG. 2 includes a body 1 provided with an operation display 3 in an outer portion thereof, and a print head 2, and the body 1 and the print head 2 are connected to each other by a conduit 4. According to the present example, the inkjet printer 10 was equipped with a makeup fluid tank 101 shown in FIG. 3 in which a light-emitting element 102 and a light-receiving element 103 are incorporated in an inner wall thereof. As the light-emitting element 102, an LED which emits light having a peak value of 375 nm was used. As a light sensor of the light-receiving element, a CdS light sensor was used, and presence or absence of visible light was detected by a circuit shown in FIG. 1. The makeup fluid tank was made of a material which blocks external visible light. A predetermined amount of the makeup fluid prepared in Example 1 was supplied to the makeup fluid tank 101. Settings were made such that an alarm would be given via the operation display 3 when a height $H_1$ of a liquid level 111 of the makeup fluid fell below a height $H_2$ of the light-receiving sensor 103, to advise an operator to supply the makeup fluid. In the present example, $H_1$ was greater than $H_2$. When light 121 having a peak value of 375 nm was emitted from the light-emitting element 102, emission of visible light 122 having a peak value of 450 nm was observed in the makeup fluid. The visible light 122 was detected by the light-receiving element 103. When a resultant fact that visible light was detected by the light-receiving element 103 was transmitted to a CPU 20 in the body 1 of the inkjet printer via a signal line 21 as shown in FIG. 4, it was correctly judged that $H_1$ was greater than $H_2$ by the algorithm shown in FIG. 5. The operation display 3 was caused to indicate that an amount of the makeup fluid being supplied was sufficient, via a signal line 22.

According to the present invention, if a tank contains a makeup fluid, a fluorescent material in the makeup fluid is caused to emit visible light by light emitted from a light-emitting element, and then the emitted visible light is detected by a light-receiving element. As a result of this, an error in detection of a liquid level which is likely to be caused due to mechanical friction between solid matters or degradation in material property is reduced, so that a liquid level can be detected with high accuracy at all times.

Example 3

Figure 6:
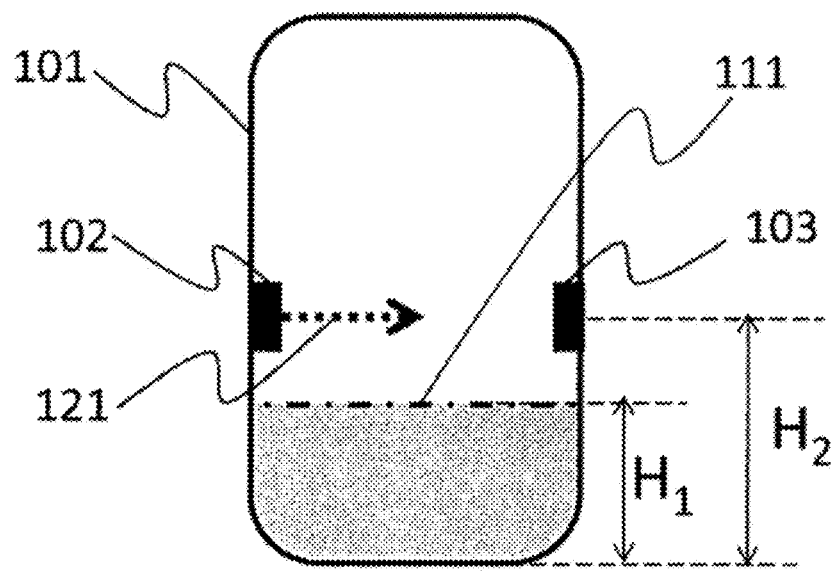
FIG. 6 is a schematic diagram of an interior of a makeup fluid tank in Example 3.

FIG. 6 is a schematic diagram of a makeup fluid tank according to the present example. As shown in FIG. 6, in the present example, the same configuration and settings as those in Example 2 were provided except that $H_1$ was set to be smaller than $H_2$. Though light 121 having a peak value of 375 nm was emitted from a light-emitting element 102, light having a peak value in a range of visible light was not detected by a light-receiving element 103. A result of the detection was processed in a similar manner to that in Example 2, so that it was correctly judged that $H_1$ was smaller than $H_2$. An operation display 3 was caused to indicate that an amount of a makeup fluid being supplied was insufficient and a makeup fluid needed to be additionally supplied, via a signal line 22.

Example 4

Figure 7:
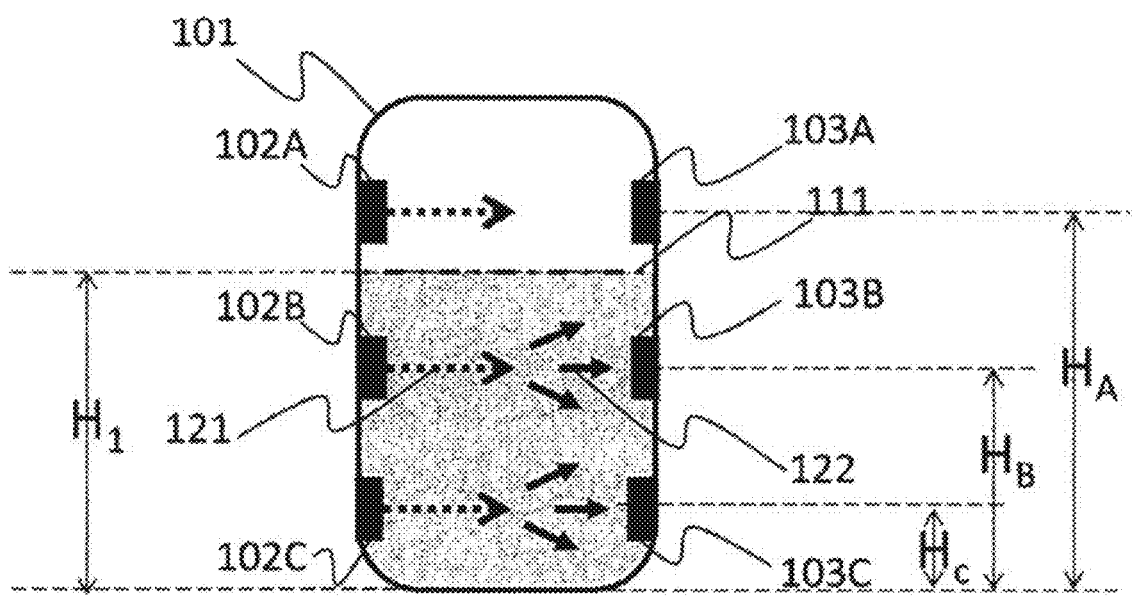
FIG. 7 is a schematic diagram of an interior of a makeup fluid tank in Example 4.

FIG. 7 is a schematic diagram of a makeup fluid tank according to the present example. As shown in FIG. 7, the same configuration and settings as those in Example 2 were provided except that; light-emitting elements 102A, 102B, and 102C and light-receiving elements 103A, 103B, and 103C were incorporated in an inner wall of a makeup fluid tank 101; $H_B$, $H_1$, and $H_A$ were set so that $H_B<H_1<H_A$; and a height of a liquid level at which an alarm was issued was set to $H_C$. When light 121 having a peak value of 375 nm was emitted from each of three positions of the light-emitting elements 102A, 102B, and 102C, emission of visible light 122 having a peak value of 450 nm was observed in a makeup fluid. While the visible light 122 was detected by the light-receiving elements 103B and 103C, the visible light 122 was not detected by the light-receiving element 103A. A result of the detection wad processed in a similar manner to that in Example 2, so that it was correctly judged that $H_B<H_1<H_A$. An operation display 3 was caused to indicate that an amount of the makeup fluid being supplied was sufficient, via a signal line 22.

Example 5

Figure 8:
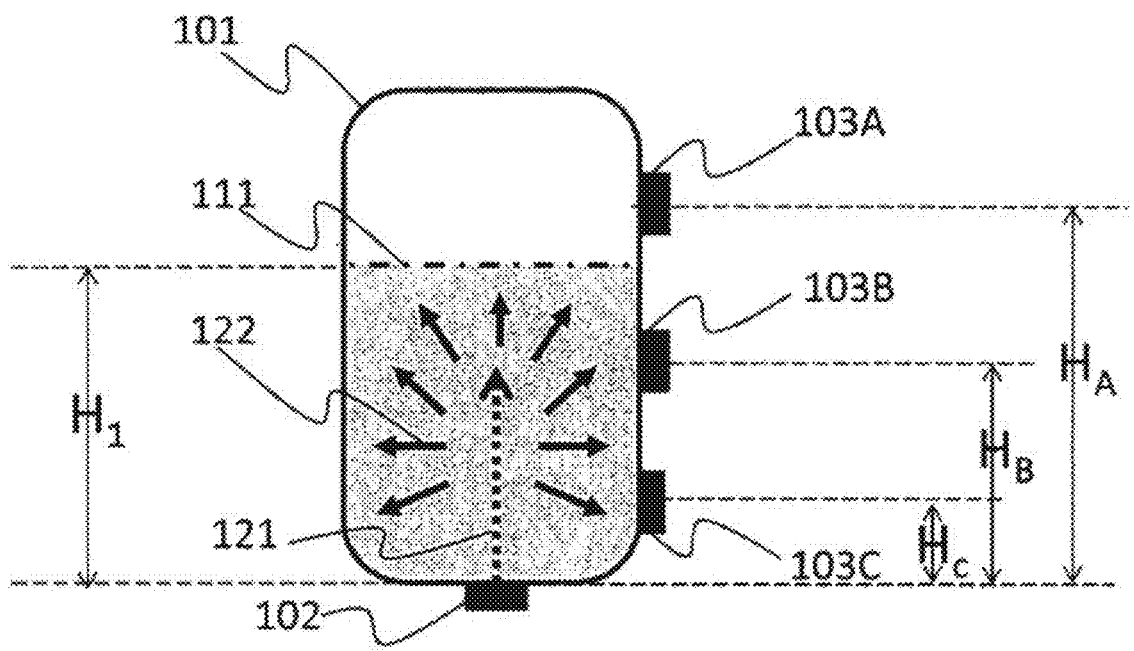
FIG. 8 is a schematic diagram of an interior of a makeup fluid tank in Example 5.

FIG. 8 is a schematic diagram of a makeup fluid tank according to the present example. As shown in FIG. 8, the same configuration and settings as those in Example 4 were provided except that respective light-receiving elements are incorporated in an outer wall of a makeup fluid tank 101 and a light-emitting element was incorporated in a bottom portion of the makeup fluid tank 101 (the outside of the makeup fluid tank). It is noted that portions of the makeup fluid tank 101 where the elements are incorporated are machined so that a light receiving function of the light-receiving element and a light emitting function of the light-emitting element can be performed respectively without being impaired. When light 121 having a peak value of 375 nm was emitted from the light-emitting element 102, emission of visible light 122 having a peak value of 450 nm was observed in a makeup fluid. While the visible light 122 was detected by the light-receiving elements 103B and 103C, the visible light 122 was not detected by the light-receiving element 103A. A result of the detection was processed in a similar manner to that in Example 2, so that it was correctly judged that $H_B<H_1<H_A$. An operation display 3 was caused to indicate that an amount of the makeup fluid being supplied was sufficient, via a signal line 22.

Example 6

Figure 9:
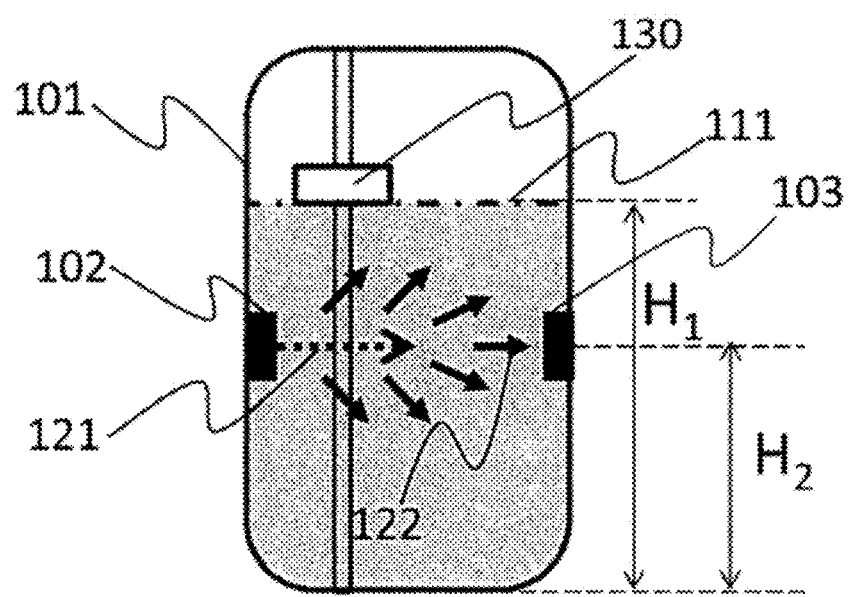
FIG. 9 is a diagram showing correlation between an amount of received light in a light-receiving element and a liquid level of a makeup fluid in Example 6.
Figure 10:
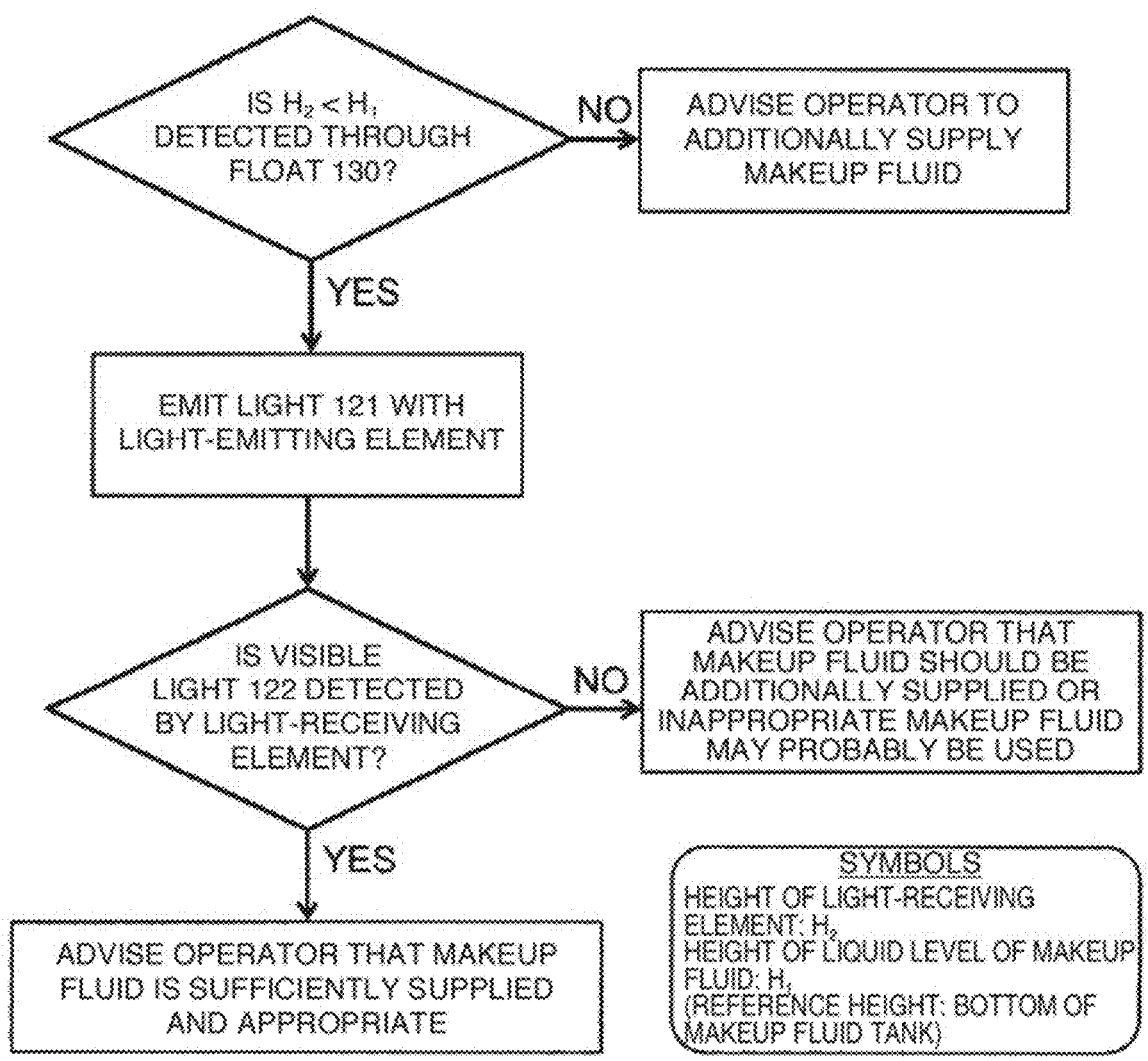
FIG. 10 is a chart showing an algorithm in Examples 6 and 7.

FIG. 9 is a schematic diagram of a makeup fluid tank according to the present example. As shown in FIG. 9, in the present example, the same configuration as that in Example 2 was provided except that a liquid-level detection system using a float 130 was attached, and the makeup fluid tank was designed so as to operate by an algorithm shown in FIG. 10. It is noted that the float 130 and a supporting bar which supports the float 130 were fixed in positions where the float 130 and the supporting bar could not impair functions of a light-emitting element and a light-receiving element. Through the float 130, it was detected that a height $H_1$ of a liquid level 111 of a makeup fluid was greater than a height $H_2$ of a light-receiving sensor. When light 121 having a peak value of 375 nm was emitted from a light-emitting element 102 based on a result of the detection, emission of visible light 122 having a peak value 450 nm was observed in the makeup fluid. The visible light 122 was detected by a light-receiving element 103. A resultant fact that visible light was detected by the light-receiving element 103 was transmitted to a CPU 20 in a body 1 of an inkjet printer via a signal line 21 as shown in FIG. 4, so that an operation display 3 was caused to indicate that an appropriate makeup fluid was sufficiently supplied, via a signal line 22.

Example 7

Figure 11:
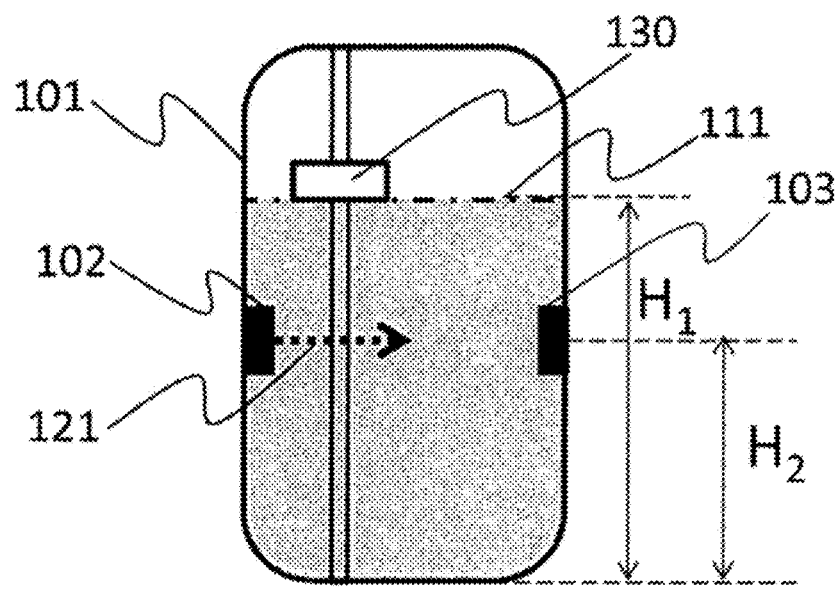
FIG. 11 is a diagram showing correlation between an amount of received light in a light-receiving element and a liquid level of a makeup fluid in Example 7.

FIG. 11 is a schematic diagram of a makeup fluid tank according to the present example. The same configuration and settings as those in Example 6 were provided except that a makeup fluid prepared according to Comparative Example 1 was supplied to a makeup fluid tank 101. Through a float 130, it was detected that a height $H_1$ of a liquid level 111 of the makeup fluid was greater than a height $H_2$ of a light-receiving sensor. Though light 121 having a peak value of 375 nm was emitted from the light-emitting element 102 based on a result of the detection, no visible light was detected by a light-receiving element 103. That result of the detection was processed in a similar manner to that in Example 7, so that an operation display 3 was caused to indicate that a makeup fluid needed to be additionally supplied, or an inappropriate makeup fluid might be probably used, via a signal line 22.

REFERENCE SIGNS LIST 1 body
2 print head
3 operation display
4 conduit
10 inkjet printer
20 CPU
21 signal line (for input to CPU)
22 signal line (for input to operation display)
101 makeup fluid tank
102 light-emitting element
103 light-receiving element
111 liquid level of makeup fluid
121 light having a peak value of 375 nm
122 visible light having a peak value of 450 nm

The invention claimed is:

1. An inkjet printer apparatus comprising:
   a print head configured to eject ink;
   a makeup fluid tank configured to store a makeup fluid;
   a display configured to display information regarding a state of the makeup fluid tank;
   a float sensor;
   a light-emitting element;
   a light-receiving element, and
   a CPU that is operatively coupled to the float sensor, the light-emitting element, and the light-receiving element, the CPU being configured to determine a characteristic of makeup fluid, wherein
   the float sensor is configured to detect an amount of the makeup fluid,
   the light-emitting element is configured to emit ultraviolet light,
   the light-receiving element is configured to detect visible light are attached to the makeup fluid tank,
   the CPU determines whether or not the visible light is detected by the light-receiving element, using the ultraviolet light that is emitted from the light-emitting element, and
   in accordance with a result of the determination, the CPU generates a display signal that indicates whether or not a fluorescent color material absorbing the ultraviolet light and emitting the visible light is included in the makeup fluid in the makeup fluid tank, and
   the CPU sends the display signal to the display.

2. The inkjet printer apparatus according to claim 1, wherein when the float sensor detects that a height of a liquid level of the makeup fluid in the makeup fluid tank is higher than a position of the light-emitting element and the light-receiving element, and the ultraviolet light is emitted from the light-emitting element and the visible light is detected by the light-receiving element, the CPU sends the display signal to the display.

3. The inkjet printer apparatus according to claim 1, wherein when the float sensor detects that a height of a liquid level of the makeup fluid in the makeup fluid tank is higher than a position of the light-emitting element and the light-receiving element, and the ultraviolet light is emitted from the light-emitting element and the visible light is not detected by the light-receiving element, the CPU sends the display signal to the display.

4. The inkjet printer apparatus according to claim 1, wherein a main ingredient of a solvent of the makeup fluid is an alcohol-based or ketone-based solvent.

5. The inkjet printer apparatus according to claim 1, wherein the fluorescent color material is a compound having a coumarin structure or a compound having a stilbene structure.

6. The inkjet printer apparatus according to claim 1, wherein light of the light-emitting element is black light with a wavelength having a peak value of between 200 nm and 400 nm.

* * * * *